(12) United States Patent
Okamoto et al.

(10) Patent No.: US 10,875,028 B2
(45) Date of Patent: Dec. 29, 2020

(54) STOCK LEVEL DETECTOR FOR ROLL MACHINE FOR MILLING

(71) Applicant: Satake Corporation, Tokyo (JP)

(72) Inventors: Takeshi Okamoto, Tokyo (JP); Hiroyuki Kawano, Tokyo (JP)

(73) Assignee: SATAKE CORPORATION, Tokyo (JP)

(*) Notice: Subject to any disclaimer, the term of this patent is extended or adjusted under 35 U.S.C. 154(b) by 864 days.

(21) Appl. No.: 14/786,264

(22) PCT Filed: Mar. 27, 2014

(86) PCT No.: PCT/JP2014/058903
§ 371 (c)(1),
(2) Date: Oct. 22, 2015

(87) PCT Pub. No.: WO2014/174980
PCT Pub. Date: Oct. 30, 2014

(65) Prior Publication Data
US 2016/0067713 A1    Mar. 10, 2016

(30) Foreign Application Priority Data

Apr. 23, 2013 (JP) .................................. 2013-090054

(51) Int. Cl.
*B02C 4/28* (2006.01)
*B02C 4/42* (2006.01)
(Continued)

(52) U.S. Cl.
CPC ................ *B02C 4/286* (2013.01); *B02C 4/42* (2013.01); *B02C 25/00* (2013.01); *G01F 23/20* (2013.01)

(58) Field of Classification Search
CPC ........... B02C 4/286; B02C 4/42; G01F 23/20; G01G 11/04; G01G 11/10
See application file for complete search history.

(56) References Cited

U.S. PATENT DOCUMENTS 2,687,235 A * 8/1954 Loffler .................... B02C 25/00
                                                        222/58
4,442,980 A * 4/1984 Oetiker .................... B02C 4/32
                                                        241/143
(Continued)

FOREIGN PATENT DOCUMENTS

CN          1078925 A      12/1993
CN          1261295 A      7/2000
(Continued)

OTHER PUBLICATIONS

Suspend—Infoplease definition Jan. 17, 2019 (Year: 2019).*

(Continued)

*Primary Examiner* — Debra M Sullivan
*Assistant Examiner* — Matthew Kresse
(74) *Attorney, Agent, or Firm* — Orion Consulting, Ltd.; Joseph P. Farrar, Esq.

(57) ABSTRACT

A roll machine for milling includes a tube type supplying unit 16, feed rolls 19, 20, a feeder gate plate 21, and main rolls 4, 5. A load detector 28 for detecting stock level is provided on inlet part 16a of the tube type supplying unit 16, a detection rod 29 for detecting the level is suspended in the tube type supplying unit 16, and one end of the detection rod 29 is connected to the load detector 28.

2 Claims, 5 Drawing Sheets

(51) Int. Cl.
*G01F 23/20* (2006.01)
*B02C 25/00* (2006.01)

(56) References Cited

U.S. PATENT DOCUMENTS

| | | | |
|---|---|---|---|
| 4,572,441 A * | 2/1986 | Sangati | B02C 4/286 241/135 |
| 4,619,408 A | 10/1986 | Sangati | |
| 5,361,995 A * | 11/1994 | Hostettler | B02C 4/286 241/159 |
| 5,433,391 A | 7/1995 | Jagger et al. | |
| 5,673,864 A | 10/1997 | Stevenson et al. | |
| 6,502,773 B1 | 1/2003 | Hostettler et al. | |
| 6,732,580 B2 * | 5/2004 | Dirksen | G01F 23/0023 73/149 |
| 2002/0074435 A1 * | 6/2002 | Kasada | B02C 4/06 241/143 |
| 2009/0140087 A1 * | 6/2009 | Bonelli | B02C 4/286 241/29 |

FOREIGN PATENT DOCUMENTS

| | | |
|---|---|---|
| FR | 2576223 A1 | 7/1986 |
| JP | 52-141265 | 11/1977 |
| JP | S6039934 U | 3/1985 |
| JP | 5-504721 | 7/1993 |
| JP | 2002504854 A | 2/2002 |
| JP | 3562541 B2 | 9/2004 |
| JP | 2005169198 A | 6/2005 |

OTHER PUBLICATIONS

International Search Report for Application No. PCT/JP2014/058903 dated Jun. 24, 2014.
Chinese Office Action for Application No. 2014800230088 dated Dec. 2, 2016.

* cited by examiner

STOCK LEVEL DETECTOR FOR ROLL MACHINE FOR MILLING

CROSS-REFERENCE TO RELATED APPLICATION

This application is a national phase entry under 35 U.S.C. § 371 of International Application No. PCT/JP2014/058903, filed Mar. 27, 2014, which claims priority to Japanese Patent Application No. 2013-090054, filed on Apr. 23, 2013, the disclosures of which are incorporated herein by reference.

BACKGROUND

1. Technical Field

The present invention relates to a stock level detector in a roll machine for milling.

2. Background Art

A stock level detector of a roll machine for milling disclosed in Japanese Patent Laid-Open No. 2002-504854 is known, which will be explained referring FIGS. 4 and 5. The sensor (108) for detecting the product of the roll machine for milling detects the weight (F) of the conveyed product. The sensor (108) is installed in the inlet part (102) for detecting the time when the sensor (108) is turned on and off, and for controlling the drive means (107). The sensor (108) includes the rod (110) for detecting the flow rate of the product by the weight. The rod (110) has a round cross section, and is supported in a direction vertical to the flowing direction of the product, that is, in the vertical direction, and supported on one while setting the other end as a free end. The sensor (108) detects the static constituent proportional to the amount of the product in the upper side, and the dynamic constituent dependent on the characteristic and the flow characteristic of the product.

Thus the time when the sensor (108) is turned on and turned off is detected and feeding is adjusted by the same signal to the detection signal. The detector has the effect that only little component of the flowing force of the product is necessary since the signal is amplified by the known electronic assembly, and only little resistance is generated against the product flow by minimizing the sensor to be installed.

However, since the sensor (108) described in Japanese Patent Laid-Open No. 2002-504854 has a configuration of providing the rod (110) and the load cell (108) protruding in the horizontal direction are connected in the L shape, the load received on the rod (110) is not applied to the load cell (108) in the vertical direction to generate twisting force at the connection part (X) of the rod (110) and the load cell (108), to cause harmful effect on the detection precision.

SUMMARY OF THE INVENTION

Technical Problem to be Solved

Accordingly, an technical object of the present invention is to provide a stock level detector for a roll machine for milling, in which a load on the rod is applied to the load cell in the vertical direction such that the detection precision is remarkably improved.

Solution to the Problem

In a stock level detector for a roll machine for milling, according to the present invention, the roll machine for milling includes a tube type supplying unit for storing stock, a feed roll provided for supplying the stock in sheet form, a feeder gate plate provided in neighborhood of the feed roll; and a main roll for crushing the stock in sheet form discharged from the feed roll, wherein a load detector for detecting stock level is provided on an inlet part of the tube type supplying unit, a detection rod for detecting the level is suspended in the tube type supplying unit, and one end of the detection rod is connected to the load detector, in the stock level detector.

The detection rod may consist of a rod part and a cone part fixed to a top end of the rod part.

Preferably, a length L of the rod part may be within range of $0.5H \leq L < H$ wherein H is a height of the tube type supply unit.

Preferably, a radius t of a base of the cone part may be within range of $0.125W \leq t < 0.17W$ wherein W is a width of a transverse section of the tube type supply unit.

Effects of the Invention

In the present stock level detector, since the a load detector for detecting stock level is provided on inlet part of the tube type supplying unit, a detection rod for detecting the level is suspended in the tube type supplying unit, and one end of the detection rod is connected to the load detector, in the stock level detector, the load on the detection rod is applied to the load detection in the vertical direction such that detection precision is remarkably improved. The load detector can detect change of the load on the detection rod proportional to stock amount in the tube type supply unit, so the current stock amount (stock level) can be detected online with improved response and continuously, based on the relationship between detected value by the load detector and the stock amount measured in advance.

If the detection rod consists of a rod part and a cone part fixed to a top end of the rod part in the stock revel detector, the stock level detector is more easily receive the load of the stock flowing down in the tube type supply unit than the case for the rod part only.

If a length L of the rod part is within range of $0.5H \leq L < H$ wherein H is a height of the tube type supply unit in the stock level detector, detection of the accumulated amount below the middle position of the stock level becomes possible.

If a radius t of a base of the cone part is within range of $0.125W \leq t < 0.17W$ wherein W is a width of a transverse section of the tube type supply unit, the stock level detector easily receives flow resist of the stock flowing down in the tube type supply unit, and detection precision is improved when the load is detected.

DETAILED DESCRIPTION

Figure 1:
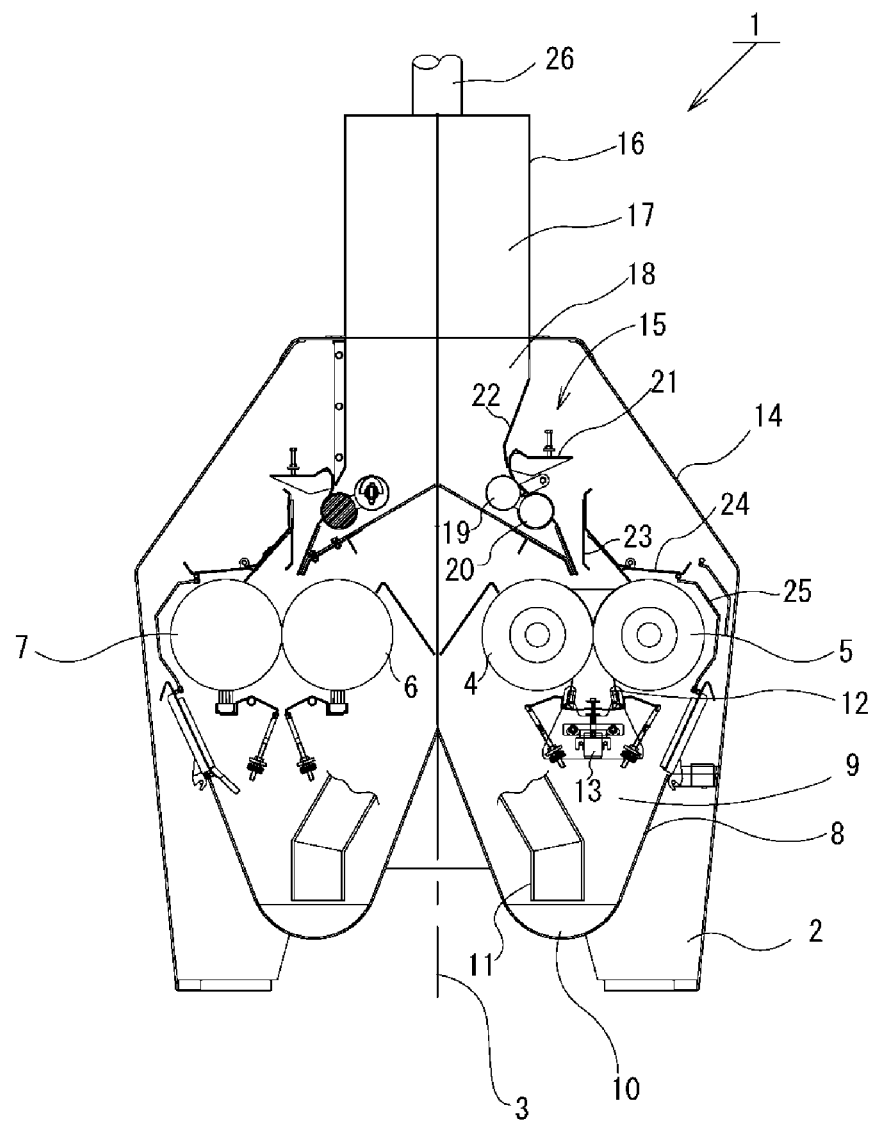
FIG. 1 is a schematic diagram illustrating entire configuration of a roll machine for milling.
Figure 2:
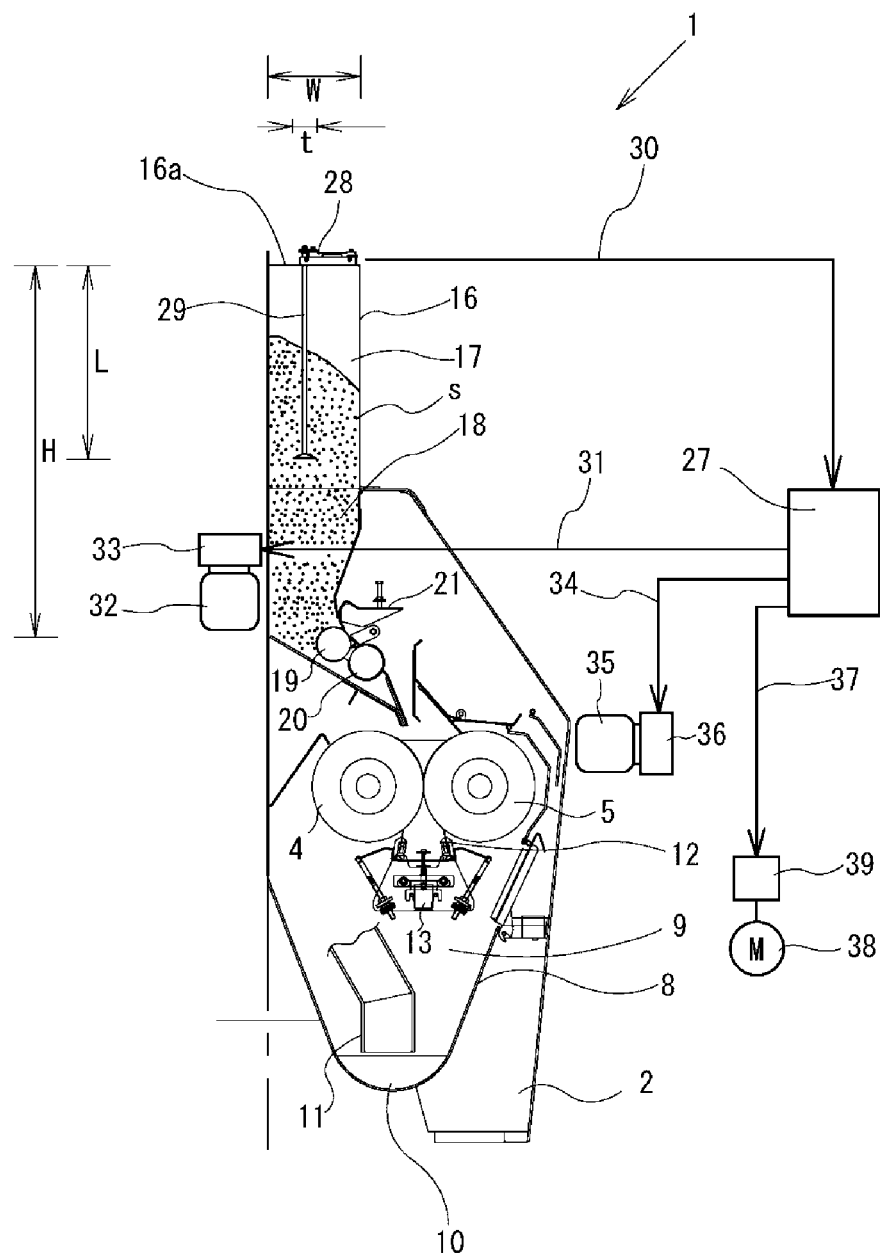
FIG. 2 is a schematic longitudinal section view illustrating configuration of a storing unit and a feeding unit.
Figure 3:
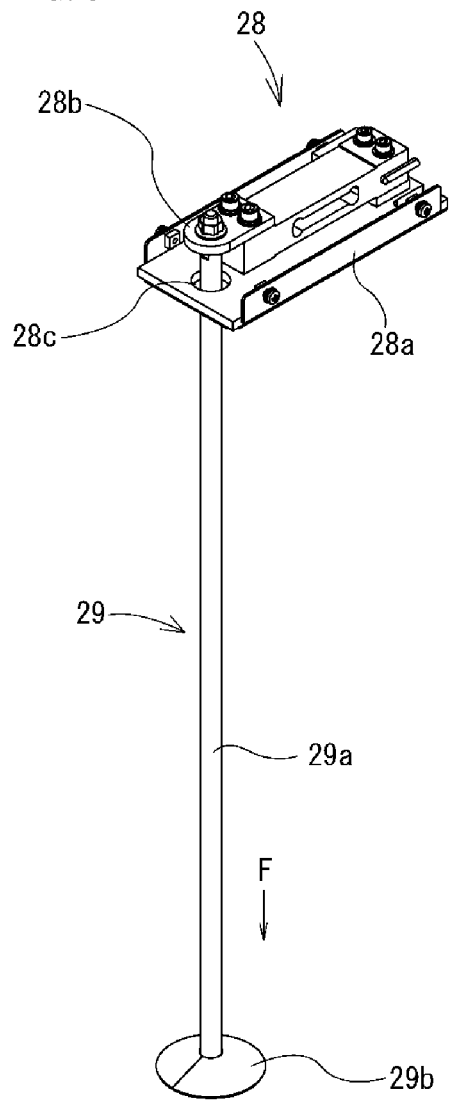
FIG. 3 is an oblique view illustrating attaching configuration of a rod and a load cell in a stock level detector according to the present invention.
Figure 4:
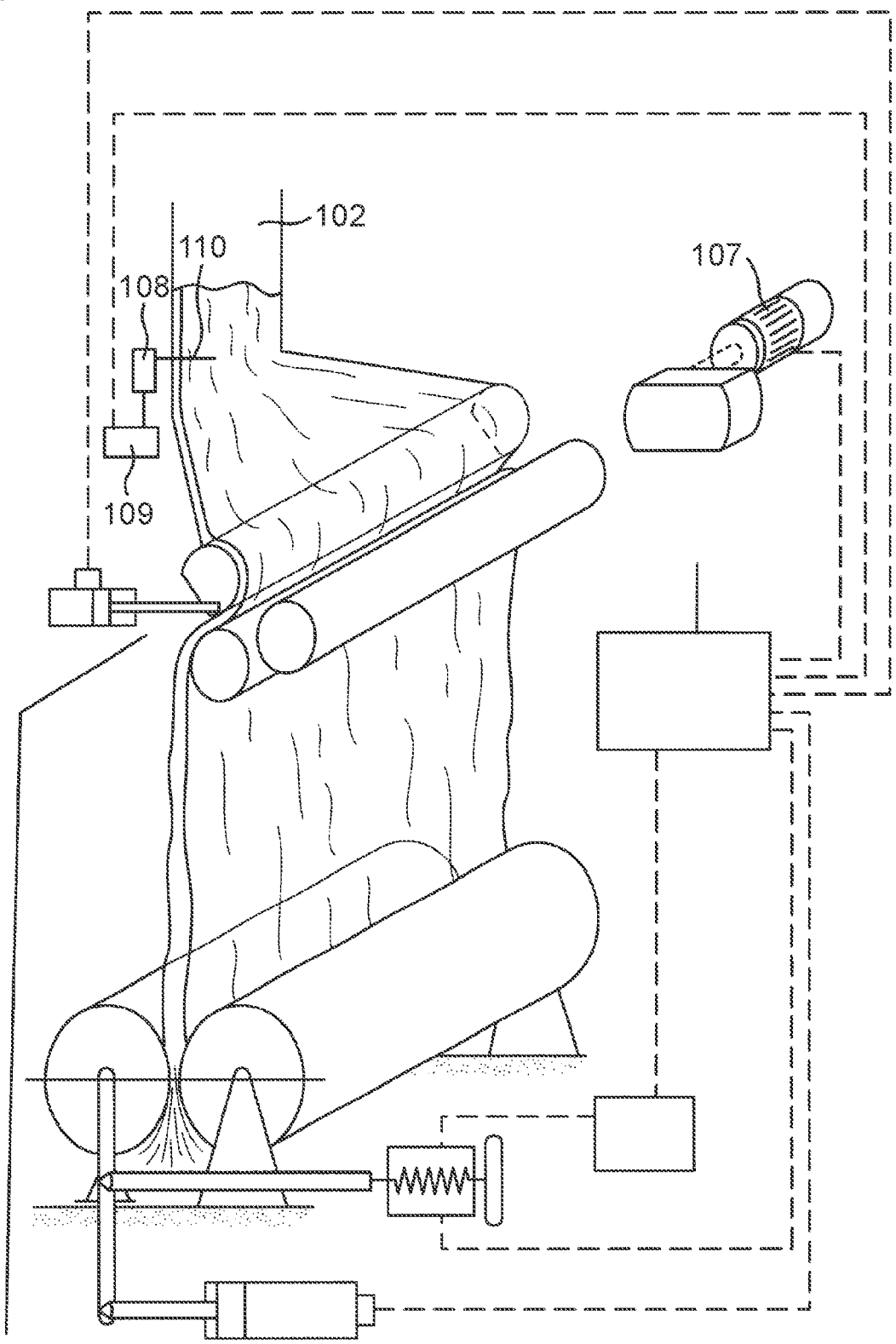
FIG. 4 is a diagram of elements of a conventional roll machine for milling.
Figure 5:
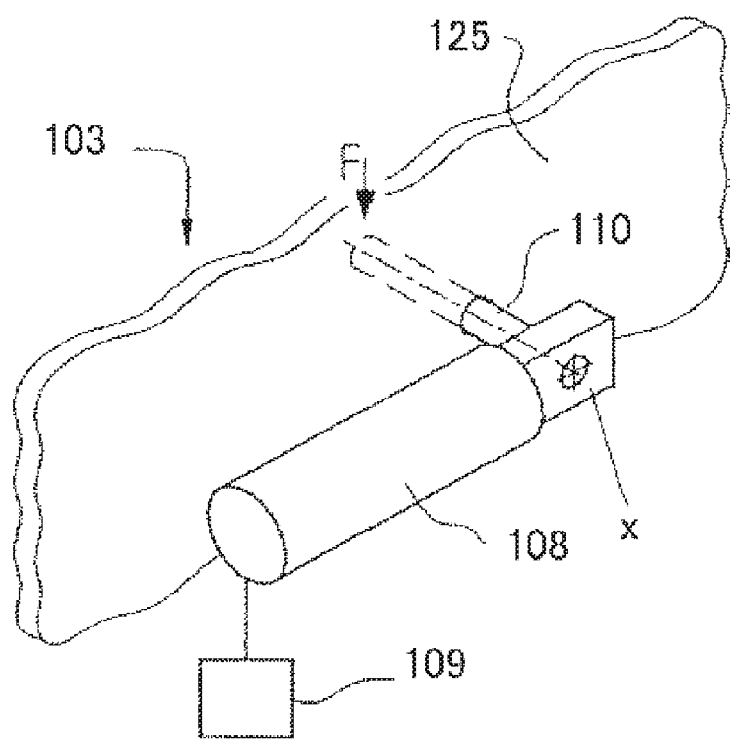
FIG. 5 is a diagram illustrating conventional alignment of sensors.

An embodiment of the present invention will be described with reference to the drawings. FIG. 1 is a schematic diagram illustrating entire configuration of a roll machine for milling according to the present invention. FIG. 2 is a schematic longitudinal section view illustrating configuration of a storing unit and a feeding unit according to the present invention. FIG. 3 is an oblique view illustrating attaching configuration of a rod and a load cell in a stock level detector according to the present invention.

As shown in FIG. 1, the roll machine for milling 1 has a partition plate 3 for dividing a frame 2 at the center, a pair of rolls 4, 5 and a pair of rolls 6, 7 symmetrical to each other. The pair of rolls 4, 5 and the rolls 6, 7 are integrally formed as a pack, and roll exchange can be immediately performed by attaching a bearing, a housing, a seal member, a spring, a roll gap adjustment device, and the like to the rolls 4, 5 (For example, Japanese Patent. Registration No. 35652541).

Each of the rolls 4, 6 on the partition plate 3 side of the frame 2 may be rotatably supported by a movable bearing and each of the rolls 5, 7 on the far side from the partition plate 3 of the frame 2 may be rotatably supported by a fixed bearing, such that the rolls 4, 6 on the movable bearing side are set as low speed rolls, and the rolls on the fixed bearing side are set as high speed rolls. A roll gap device not shown in the figure may be individually provided between the pair of rolls 4, 5 and between the pair of the rolls 6, 7.

A grinding room 9 surrounded by a cover below the rolls 4, 5 has an outflow hopper 10 in its lower part, and a transport pipe for transporting the grinded stock is installed in the outflow hopper 10. A scraper 12 is further individually installed in the pair of the rolls for scraping the stock attached to the pair of the rolls 4, 5. The scraper 12 contacts on the surface of the rolls 4, 5 by a supporting member 13.

A front door 14 is provided on the obliquely upper side of the rolls 4, 5. A stock supply unit 15 is provided between the front door 14 and the partition plate 3. The stock supply unit 15 consists of, a stock supplying room consisting of a stock supplying tube 16, a supplying hopper 18 connected to the stock supply room 17, a pair of front and rear feed rolls 19, 20 provided for supplying the stock to a grinding roll in a thin sheet form, a feeder gate plate 21 set over the front feed roll 19 of the pair of the feed rolls 19, 20, a guide plate 22 provided on the side of the supplying hopper 18, and a guide chute 23 which makes the stock in a thin sheet form discharged from the front feed roll 19 flow down to gap between the main rolls 4, 5 for grinding.

When the pair of the feed rolls 19, 20 are set as feed rolls for brake stock except or the first brake, a screw conveyer are used for the rear feed roll 20 instead of the roll. The feed gate plate 21 includes a regulating handle for adjusting the press force to the front feed roll 19 to regulate the flow rate of the stock.

Plural roll covers, that is, an upper cover 24 and outer cover 25 of the main rolls 4, 5, covers circumference of the pair of the man rolls 4, 5. A pneumatic pipe 26 for transporting the grinded stock of the roll machine for milling 1 to the next process is provided on the top of the stock supplying tube 16.

As shown in FIG. 2, in the roll machine for milling 1, a control unit 27 for variable speed control of rotation number of the main rolls 4, 5 and the feed rolls 19, 20 is installed, and the control unit 27 is configured to cooperate with the stock level control. That is, a load detector (a load cell) 28 is provided in the stock supplying tube 16, and a detection rod 29 for level detection are connected to the load detector 28 such that the detection rod 29 is suspended in the stock supply room 17. Since load applied on the detection rod 29 varies according proportionally with the stock amount in the stock supply room 17 in the load detector 28, the current stock amount (stock level) can be detected online continuously, based on the relation between the detected value of the load detector 28 and the stock amount measured in advance. The electric signal from the load detector 28 is transferred to the control unit 27 via a signal line 30. The control unit 27 is electrically connected to a speed control unit 33 of a geared motor 32 for rotating the feed rolls 19, 20 via the signal line. A preset program controls the rotation number of the feed rolls 19, 20.

The control unit 27 is further electrically connected to a gap control unit 36 of a roll gap adjustment actuator 35 for the main rolls 4, 5 via a signal line 34, and to a invertor 39 for variable speed control of a rotation drive motor 38. More specifically, when the stock in the stock supply room 17 become empty and the load detector detects that the stock become empty, the roll gap adjustment actuator 35 controls to widen the roll gap, decrease the rotation number of the main rolls 4, 5 to end grinding operation, and stop the feed rolls 19, 20. On the other hand, when the stock is started to be supplied to the stock supply room 17, the load detector 28 detects that the stock exists and the roll gap adjustment actuator 35 regulates the roll gap to be appropriate for grinding, while the rotation number is increased to start the grinding operation, and the feed rolls 19, 20 are controlled to operate at the rotation number corresponding to the stock level.

In the control above, all speed changes of acceleration and deceleration are performed gradually not to disturb the following process, and what is called feed forward control is executed for the stock level to keep average stock amount finally.

Attaching configuration of the detection rod 29 and the load detector 28 in the stock level detector according to the present invention will be described referring to FIG. 3, next. As shown in FIGS. 2, 3, the load detector 28 is fixed in the inlet part 16a of upper part of the stock supplying tube 16 through a stand 28a. As shown in FIG. 3, the suspended detection rod 29 is connected to the detection unit 28b.

The detection rod 29 consists of a rod part 29a and a cone part 29b fixed to the top end of the rod part 29a. By providing the cone part 29b, the detector become sensitive to the load of the stock flowing down in the stock supply room 17 than the case only the rod part 29a is provided, and detection in control accuracy of around 3000 g is possible, increasing detecting precision. It should be noted that preferably, a length of the rod part 29a is within range of 300 mm to 800 mm, a radius of a base of the cone part 29b is within range of 30 mm to 100 mm. The length of the rod part 29a is, as shown in FIG. 2, relatively determined corresponding to the height of the stock supplying tube 16. For example, when the height of the stock supplying tube 16 is assumed to be H, the length of the rod part 29a is preferably within range of $0.5H = < L < H$. With the configuration, detection of the accumulated amount below the middle position of the stock level becomes possible.

The radius of the base of the cone part 29b is similarly relatively determined corresponding to a width of a transverse section of the stock supplying tube 16. For example, when the width of the transverse section of the stock supplying tube 16 is assumed to be W, the radius t of the base of the cone part 29b is preferably within range of $0.125 W = < t < 0.17 W$ or $\frac{1}{8} W = < t < \frac{1}{6} W$. With the configuration, the stock level detector easily receives flow resist of the stock flowing down in the tube type supply unit, and detection precision is improved when the load is detected.

In the stand 28a of the load detector 28, opening 28c is provided for the rod part 29a of the detection rod 29 to slide upward and downward.

Operation in the above configuration will be described below. When the material is charged from the stock supplying tube 16, the stock level increases as the time passes. At this time, the detection value of the load detector 28 also increases proportionally to the stock amount in the stock supply room 17, as the time passes. Thus, when the stock level and the load applied on the load detector 28 are investigated in advance, the current stock amount (stock level) can be detected online continuously. When the load detector 28 does not detect targeted detection value after the predetermined time, the control unit 27 determines that the stock level is substantially lower than the reference, stops the rotation of the feed rolls 19, 20, and closes the gap of the feeder gate plate 21, while controlling the pair o the main rolls 4, 5, to separate.

On the other hand, when the load detector 28 detects detection value surpassing the targeted detection value before the predetermined time passes, the control unit 27 determines that the stock level is substantially higher than the reference, increases the rotation speed of the feed rolls 19, 20, and widens the gap of the feeder gate plate 21, while controlling the rotation speed of the pair of the main rolls 4, 5, to increase.

As described above, the present embodiment has excellent effect that, since the load detector 28 for detecting the stock level is provided in the stock supplying tube 16, and the detection rod 29 for detecting the level is connected to the load detector 28 while being suspended in the stock supply room 17, the load received by the detection rod 29 acts on the load detector 28 in the vertical direction to extensively increase the detection precision.

The present embodiment also has the effect that, since the load detector 28 can detect the change of the load applied to the detection rod 29, which is proportional to the stock amount in the stock supply rom 17, the current stock amount (stock level) can be detected online with improved response and continuously.

INDUSTRIAL APPLICABILITY

The present invention can be applied to the roll machine for milling and the like.

LIST OF REFERENCE NUMERALS 1 roll machine for milling
2 frame
3 partition plate
4 roll
5 roll
6 roll
7 roll
8 cover
9 grinding room
10 outflow hopper
11 transport pipe
12 scraper
13 supporting member
14 front door
15 stock supply unit
16 stock supplying tube
17 stock supplying room
18 supplying hopper
19 feed roll
20 feed roll
21 feeder gate plate
22 guide plate
23 guiding chute
24 upper cover
25 outer cover
26 pneumatic pipe
27 control unit
28 load detector (load cell)
29 detection rod
30 signal line
31 signal line
32 geared motor
33 speed control unit
34 signal line
35 roll gap adjustment actuator
36 gap control unit
37 signal line
38 rotation drive motor
39 invertor

The invention claimed is:

1. A stock level detector for detecting a level of a stock in a roll machine for milling and crushing with a main roll, the stock supplied in a sheet form to the main roll from an inlet part of an upper part of a supply tube for storing stock having a transverse section of a predetermined width, characterized in that the stock level detector comprises:

a stand disposed at a top end of the supply tube;

a load cell for detecting a magnitude of a load that varies with the stock level in the supply tube, on an exterior part of the supply tube through the stand; and a detection rod having one end coupled to the load cell and another end suspended vertically downward into the supply tube for detecting the magnitude of the load applied to the another end of the detection rod that varies with the stock level in the supply tube, wherein the stock level is detected based on the load applied to the another end of the detection rod and detected by the load cell, wherein the detection rod comprises a rod part, with one end connected to the load cell, and a cone part fixed to another end of the rod part of the detection rod, wherein a radius t of a base of the cone part is within a range of $0.125W \leq t < 0.17W$ wherein W is the predetermined width of the transverse section of the supply tube.

2. A stock level detector according to claim 1, wherein a length L of the rod part of the detection rod is within a range of $0.5H \leq L < H$, wherein H is a height of the supply tube.

* * * * *